3,049,588
QUALITY CONTROL SYSTEM
John S. Barnett, Sepulveda, Calif., assignor, by mesne assignments, to Precision Controls Corporation, Newbury Park, Calif., a corporation of California
Filed Aug. 28, 1959, Ser. No. 836,791
12 Claims. (Cl. 178—6)

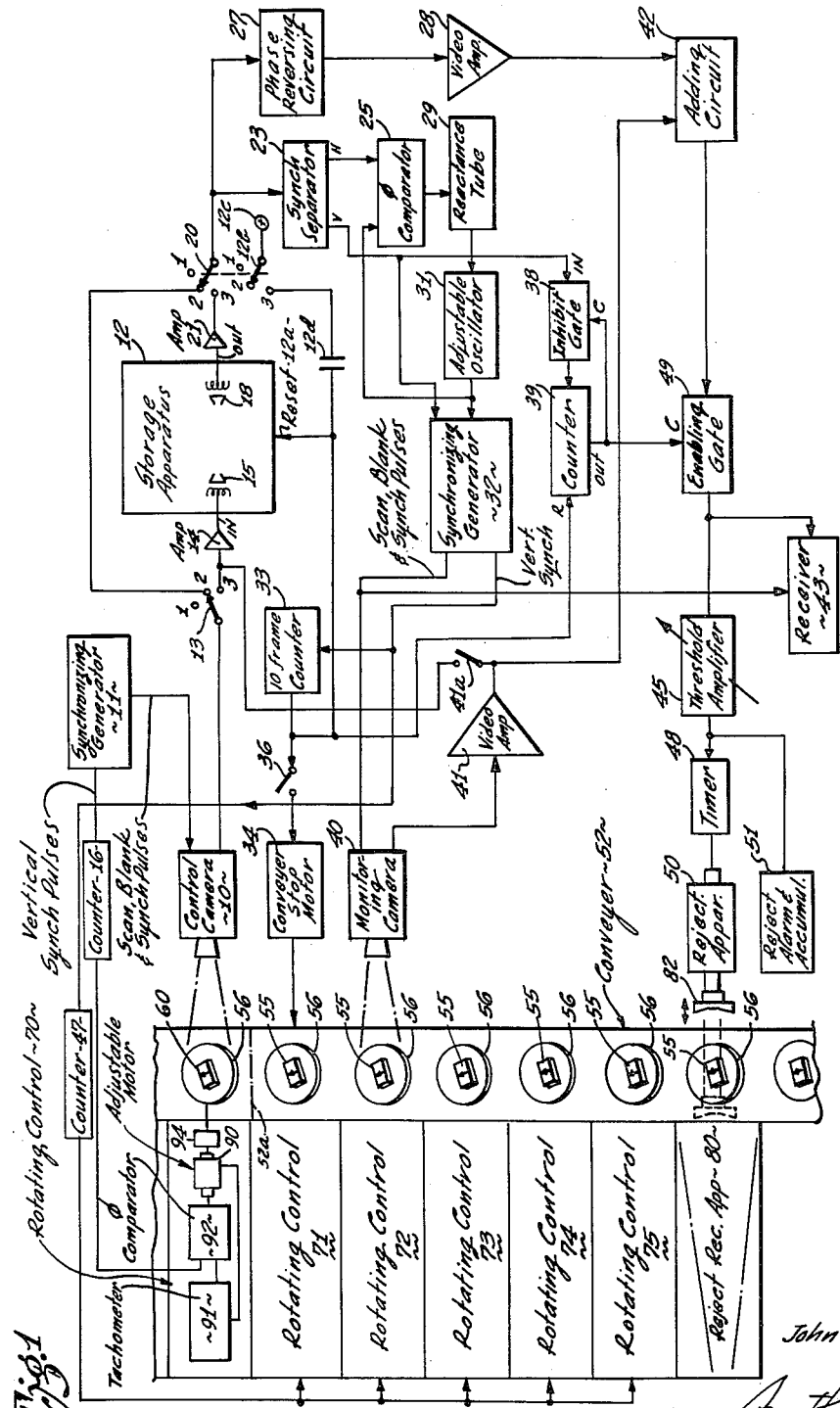

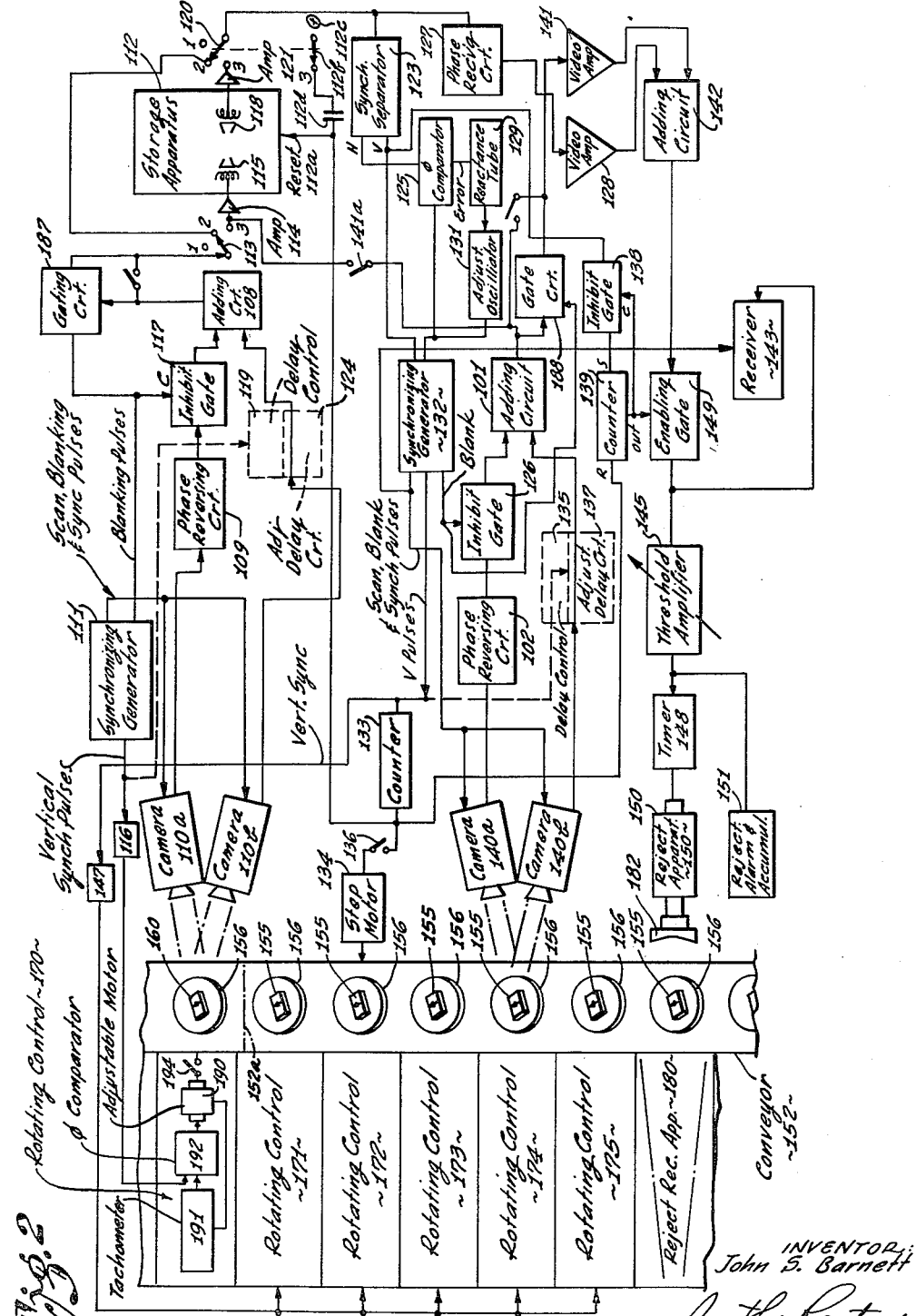

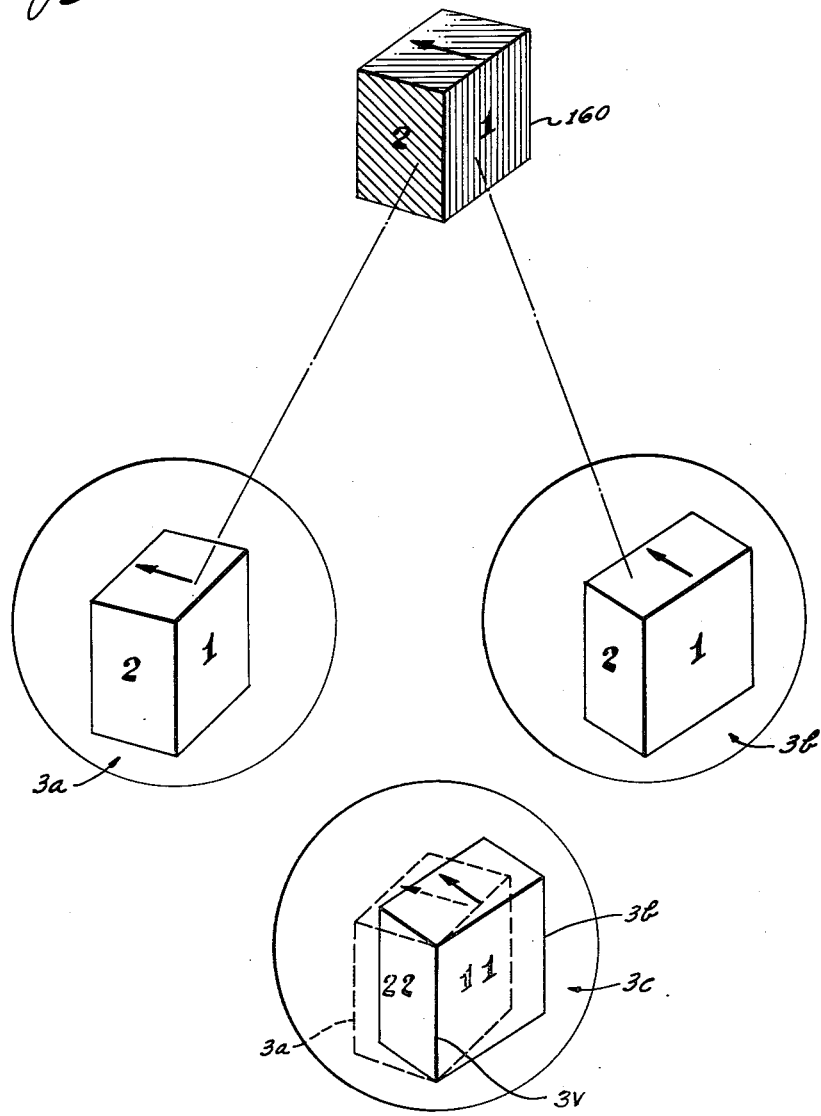

This invention relates to a quality control or inspection system which monitors the physical appearance of an object and compares it to the physical appearance of a standard or model.

There are many applications in which it is necessary to compare two objects to determine if the quality of one is below a predetermined minimum value. In systems for comparing objects, various characteristics of the objects have been utilized for the comparison. For example, the voltage of a battery, the resistance of a resistor or the intensity of the light emitted from a light source are utilized. When, however, the dimensions and appearance of complex shaped objects are to be compared, automatic systems are generally not utilized.

In the specific illustrative embodiments of this invention, the physical appearance of a complex shaped object may be compared with a standard object and a predetermined deviation in appearance and shape therebetween may be readily detected. The objects which are monitored or inspected may be any two or three dimensional object and includes, for example, such objects as printed labels, statuary, rivet patterns, photographs, gears, etc.

The standard object or model with which the objects are compared may be in the form of electrical signals representing the standard object or a photograph of the standard object, or the standard object itself. In one embodiment of this invention, the standard object is scanned by a control television camera and the video signals representing the standard object are recorded in a magnetic storage apparatus. The standard object may be rotated at a predetermined speed in synchronism with the operation of the control camera so that all sides of the standard object are scanned. Thereafter, the magnetically recorded signals may be reproduced and utilized to successively monitor the quality of objects which are similar to the standard object.

The reproduced signals are provided from the storage apparatus to a synchronizing pulse separator which separates the synchronizing pulses from the reproduced video signals and operates a monitoring television camera in synchronism with the reproduced television signals. The monitoring camera is positioned to scan one of the objects, the quality of which is to be measured, which object is supported and rotated on a stepping conveyor. The object is rotated in synchronism with the monitoring camera and, therefore, at the same speed of rotation and with the same instantaneous orientations as the standard object when it was scanned by the control camera.

The reproduced standard video signals are also introduced to a phase reversing circuit, and the phase reversed signals are provided to an adding circuit together with the video signals from the monitoring camera. Thes phase reversed signals representing the standard object are, in this manner, introduced together with the signals representing the object being monitored to the adding circuit. The output of the adding circuit will be at a constant magnitude because the magnitude of the signals of successively scanned points on the standard and monitored objects cancel due to the phase reversal of the standard video signals. When, however, the appearance of the monitored object differs from the standard object, the magnitude of the signal from the adding circuit momentarily increases. The signals from the adding circuit are introduced to a threshold responsive device which detects a predetermined increase in magnitude of the signal from the adding circuit and operates reject apparatus to reject the object being monitored.

The threshold responsive device is time threshold responsive as well as magnitude threshold responsive so that if the monitored video signals are slightly out-of-step with the phase reversed monitored signals, a reject operation is not initiated.

In another embodiment of this invention the standard televison signals represent a three dimensional image of the standard object. Two control cameras are utilized to provide the standard signals and two monitoring cameras are utilized to provide the monitoring signals. The signals from one of the two control cameras are phase reversed and added to the other so that a composite signal is provided representing a particular contour of the standard object. The composite signal is gated to remove all the composite signals except those representing the contour. As the standard object is rotated, the signals are cancelled except at points on the standard object at a predetermined distance or contour from the two control cameras. The varying contour signals of the standard object are then phase reversed and added to the corresponding varying contour signals of the monitored object to determine any deviation of the contour of the object being monitored from the standard object.

Each monitoring sequence of an object includes a number of scanning frames. Means are provided for successively changing the particular contour being monitored for successive frames so that the entire silhouette of the object is monitored. The contour changing means includes delay means for shifting the signals from one of the standard cameras and also from one of the monitoring cameras. The television signals representing the successive contours of the standard object and the blanking and synchronizing information are recorded on a single channel in the storage apparatus. All the information necessary for comparing the monitored signals is in this manner derived from a single recording channel.

Other features of this invention relate to the provision of means for recording the signals from a camera arrangement and then thereafter for comparing the recorded signals with signals generated by the same camera arrangement. Any change of an object or image with time may in this manner readily be detected so that the system functions as a reconnaisance system.

Further features and advantages of this invention will become apparent upon consideration of the following description when read in conjunction with the drawing wherein:

FIGURE 1 is a functional representation of a two-dimensional monitoring system of this invention;

FIGURE 2 is a functional representation of a three-dimensional monitoring system of this invention; and FIGURE 3 is a diagrammatic representation illustrating the contour scanning effect provided for in the three-dimensional monitoring system of this invention.

Referring first to FIGURE 1, which illustrates a two-dimensional monitoring system, a number of objects 55 to be monitored or inspected are supported on a step conveyor 52. As illustrated in FIGURE 1, the objects 55 are rectangular boxes, but any two or three dimensional objects may be monitored. The objects 55 are successively scanned by a monitoring television camera 40 which generates line scan video signals representing the objects 55 as they are successively positioned in front of the camera 40. The television signals may be conventional at a repetition rate of 30 frames per second with each frame including two interlaced fields of 262.5 horizontal scanning lines each. The video signals generated by the monitoring camera 40 are combined with video signals representing a standard or reference object 60, also shown supported on the conveyor 52, to determine any deviation in the physical appearance of the objects 55 from the physical appearance of the standard object 60. Though the object 60 is illustrated in FIGURE 1 as being supported on the conveyor 52, the object 60 may be supported on a separate platform, not shown, but as indicated by the line 52a in phantom.

The standard or reference object 60 is rotatably supported on one of a number of rotatable fixtures or platforms 56 which are movable with the step conveyor 52. The standard object 60 is positioned adjacent a control television camera 10 which may be similar to the monitoring camera 40. The control camera 10 scans the standard object 60 as it rotates with its supporting platform 56 on the step conveyor 52. The speed of rotation of the platform 56 is controlled by a rotating control arrangement 70 that is synchronized with the camera 10 by a synchronizing generator 11. The synchronizing generator 11, which may be conventional, supplies the conventional scanning, blanking and synchronizing signals to operate the control camera 10, and it also supplies the vertical synchronizing pulses to the rotating control arrangement 70. Actually, the vertical synchronizing pulses are introduced to a counter 16 which provides one pulse to the control arrangement 70 for each two introduced thereto from the synchronizing generator 11. With conventional frequency interlaced scanning two vertical synchronizing pulses are provided from the generator 11 during each frame but only one pulse for each frame is provided from the counter 16 to the control arrangement 70.

The step conveyor 52 includes illustratively six similar rotating control arrangements 70 through 75 but only the control arrangement 70 is synchronized by the vertical synchronizing pulses from the generator 11. Each of the control arrangements 70 through 75 is associated with and rotates an individual one of the rotating platforms 56. Each of the control arrangements 70 through 75 includes an adjustable speed motor 90 which drives its associated rotating platform 56 through a clutch 94. The clutch 94 in the arrangements 70 through 75 may be automatically released as the conveyor 52 is stepped to initiate the rotation of the associated platform 56 before it is stepped adjacent the camera 10. The clutches 94 may also be successively engaged to halt the platform rotation after the platforms are stepped from in front of the camera 40.

The motor 90 in each of the control arrangements 70 through 75 has a nominal speed, illustratively, of 1,800 revolutions per minute so that each of the platforms 56 is rotated at a nominal speed of 30 revolutions per second. Each of the motors 90 also drives an associated tachometer 91 which develops a signal proportional to the speed of the motor 90 and introduces it to an associated phase comparator 92. The signal is in the form of a single pulse generated during each rotation of the platform 56 and the tachometer 91. The phase comparator 92 compares the phase of the signal developed by the tachometer 91 with the phase of the pulse from the counter 16 and develops an error signal in accordance with any difference therebetween. The error signal is coupled from the comparator 92 to adjust the speed of the motor 90 so that the rotating speed of the platform 56 is synchronized with the vertical synchronizing pulses from the generator 11 and also with the scanning frames of the video signals. During each scanning frame of the control television camera 10, the platform 56 which supports the standard object 60, therefore, completes one revolution. Moreover, the platform 56 and the standard 60 are at a particular angular orientation with respect to the camera 10 at the instant the pulses are received from the counter 16. Illustratively, at the beginning of each frame the arrow on the standard object 60 may be pointing to the camera 10.

The control camera 10 scans the rotating standard object 60 line by line and develops line-scan video signals representing the standard object 60. The line-scan video signals representing the standard object 60 are hereafter referred to as the standard television signals. The standard television signals from the control camera 10 are coupled to the movable arm of a three-position manual switch 13. With the movable arm at terminal 1 of the switch 13 the television signals are inhibited. With the arm positioned at terminal 2 of the switch 13 the television signals are provided to a switch 20 which is similar to the switch 13. If the switch 20 is also set with its movable arm at its terminal 2 the standard television signals are coupled directly through the switches 13 and 20 without recording them in a storage apparatus 12. Assuming first, however, that the switch 13 is set at terminal 3 and the switch 20 is set at its terminal 2, the standard television signals are provided through the switch 13, and a recording amplifier 14 to a recording head 15 which is part of the storage apparatus 12. The storage apparatus 12 may also include a magnetic drum or magnetic tape, not shown, upon which the standard television signals are recorded. The standard television signals may illustratively include 10 scanning frames so that sufficient storage for at least 10 frames is provided.

The storage apparatus 12 includes a reset terminal 12a for receiving a control potential for resetting the storage apparatus 12 to reproduce the standard television signals. When the objects 55 on the conveyor 52 are to be automatically and successively inspected, the switch 20 and an associated reset switch 12b, which may be ganged thereto, are moved to their respective terminals 3. The switch 12b couples a pulse from the positive potential source 12c through the switch 12b and a capacitor 12d to the reset terminal 12a of the storage apparatus 12. The reset pulse functions to initiate the reproduction of the standard television signals. The standard television signals are picked up or reproduced by a reading or reproducing head 18 positioned adjacent the magnetic surface, not shown, in the apparatus 12. The reproduced standard signals are coupled through a reading amplifier 21 and the switch 20.

If it is desired to utilize the control camera 10 continuously to scan the rotating standard object 60, the storage apparatus 12 is not utilized, and the platform 56 which supports the standard object 60 would not be included as part of the step conveyor 52 so it does not move when the conveyor 52 is stepped. When the storage apparatus 12 is utilized, the standard television signals may be recorded and thereafter the apparatus 12 functions as the source of standard signals so that the control camera 10 need only be utilized once. The platform 56 which supports the standard object 60 may then be part of the step conveyor 52 as illustrated in FIGURE 1.

Assuming either that the standard signals are recorded by the apparatus 12 or that they are coupled directly through the switches 13 and 20, the operation of the rest of the monitoring system illustrated in FIGURE 1 is similar. The input information is then television signals representing a standard object but the signals may be derived from scanning a standard, from scanning a photograph of the standard or from a storage medium upon which they were previously recorded. The standard signals through the switch 20 are introduced to a synchronizing separator 23 and to a phase reversing circuit 27. The synchronizing separator 23, which is conventional in the television art, separates the horizontal and vertical synchronizing pulses from the composite television signal developed by the control camera 10. The separated horizontal synchronizing pulses from the separator 23 are introduced to a phase comparator 25 which forms part of an arrangement for synchronizing a generator 32 with the reproduced standard television signals. It is necessary to provide for this synchronization when the standard television signals have been recorded. If the signals are not recorded, the control camera 10 and the monitoring camera 40 may be operated by a common synchronizing generator, not shown, so that synchronization would be readily affected.

The phase comparator 25 compares the phase of the separated horizontal synchronizing pulses from the separator 23 with the phase of pulses provided from an adjustable oscillator 31. The oscillator 31 may have nominal oscillating frequency of 15,750 pulses per second which is the illustrative repetition rate of the horizontal synchronizing pulses of the standard television signals produced by the camera 10. The phase comparator 25 develops an error signal in accordance with the difference in phases between the separated horizontal synchronizing pulses and the pulses from the oscillator 31. The error signal from the comparator 25 is provided to a reactance tube 29 which adjusts the variable oscillator 31. The pulses from the oscillator 31 are, therefore, synchronized with the horizontal synchronizing pulses of the standard television signals. The synchronizing generator 32 which receives the synchronized pulses from the oscillator 31 and also the vertical synchronizing pulses from the separator 23 supplies the conventional scanning, blanking and synchronizing pulses to the monitor camera 40 briefly described above.

The monitor television camera 40 scans one of the objects 55 which is positioned adjacent thereto on the step conveyor 52. The rotation of the object 55 on the platform 56 is synchronized with the vertical synchronizing pulses from the synchronizing generator 32 in a similar manner as the rotation of the standard object 60 is synchronized with the vertical synchronizing pulses from the generator 11. The vertical synchronizing pulses from the generator 32 are provided to a counter 47 which provides one pulse during each frame to the rotating control arrangements 71 through 75. As described above, the arrangements 71 through 75 are similar to the control arrangement 70. The control arrangement 70 is synchronized with the control camera 10, and the arrangements 71 through 75 are synchronized with the monitoring camera 40. The rotation of the platforms 56 as well as the operation of the monitoring camera 40 are in this manner, synchronized with the standard television signals. At any particular instant the objects 55 have a similar orientation with respect to the scanning frame of the television camera 40 as did the standard object 60 with respect to the scanning frame of the camera 10.

The vertical synchronizing pulses from the generator 32 are also provided to a frame counter 33. After a predetermined number of vertical synchronizing pulses from the generator 32 have been counted, the counter 33 provides an operating potential through a switch 36 to a step motor 34 to step the conveyor 52 to position the next object 55 adjacent the monitoring camera 40. The switch 36 may be opened illustratively to prevent the movement of the conveyor 52 when the standard television signals are being generated by the camera 10. The counter 33 may operate the step motor 34 three times each second which is once at the end of each 10 scanning frames of the monitoring camera 40. As described above, the control camera 10 records at least 10 successive frames in the storage apparatus 12.

As also described above, the standard television signals through the switch 20 are provided to a phase reversing circuit 27 as well as to the synchronizing separator 23. The phase reversing circuit 27, which may, for example, be a single stage amplifier, reverses the phase of the standard television signals effectively shifting them 180 degrees. The phase reversed signals from the circuit 27 are coupled through a video amplifier 28 to one input terminal of an adding circuit 42. The video signals from the monitoring camera 40 are coupled through a video amplifier 41 to the other input terminal of the adding circuit 42. The two sets of video signals are added by the circuit 42 with successive instantaneous magnitudes canceling each other to arrive at a continuous constant output signal from the adding circuit 42 as long as the object 55 has the exact physical appearance as the standard object 60.

In the standard television signal utilized in the United States, black has a maximum magnitude and white has a minimum magnitude with the various shades of gray falling therebetween. By phase reversing the standard signals, the magnitudes represented in black are converted to magnitudes representing white with the entire gray spectrum therebetween being reversed. As long as the instantaneous magnitudes of the standard signals before reversing are identical to the instantaneous magnitudes of the signals from the camera 40 an unvarying signal is provided from the adding circuit 42.

The signal from the adding circuit 42 is introduced to a gate 49 which is enabled under control of the vertical synchronizing pulses separated from the standard television signals by the synchronizing separator 23. The separated vertical synchronizing pulses are provided from the separator 23 through a normally enabled gate 38 to a counter 39. The counter 39 enables the gate 49 a number of scanning frames after a predetermined number of vertical synchronizing pulses, in order to permit the camera 40 and the platforms 56 to come into synchronization with the standard television signals. If either the camera 40 or the platform 56 would be out of synchronization, the adding circuit 42 would provide a signal indicating a reject of the object 55 being scanned. The counter 39 also disables the gate 38.

When the gate 49 is enabled, the signals through the gate 49 are introduced to a threshold amplifier 45 which responds to a signal exceeding a predetermined amplitude for a predetermined interval. The predetermined amplitude is exceeded only when the instantaneous magnitude of the signals from the video amplifier differs by a predetermined value from the instantaneous magnitude of the video signals through the switch 20. The threshold amplifier 45 includes integrating circuit means, not shown, and is therefore responsive only after a predetermined interval to allow for a small degree of misalignment between the position of the object 55 on the platform 56 and the standard object 60 on a platform 56. If the object 55 is misaligned, for example, by less than 0.001 inch with respect to the camera 40, the threshold amplifier 45 does not operate to reject it. When the amplifier 45 recognizes the predetermined difference in the physical appearance between the object 55 being scanned and the standard object 60, it couples an operating potential to a reject alarm and accumulator 51, and to a timer 48. The reject alarm and accumulator 51 provides a visible or audible indication that a poor quality object 55 has been detected and it keeps track of the number of rejects. The timer 48 delays the provision of a control potential to a reject apparatus 50 until the object 55 being scanned is stepped from adjacent the camera 40 to a position adjacent the apparatus 50.

Under control of the counter 33 each stepping sequence of the conveyor 52 has a duration equivalent to 10 scanning frames which is ⅓ of a second. The reject apparatus 50 is positioned adjacent the conveyor 52 four steps away or 4 times ⅓ of a second away. The timer 48 therefore delays the operation of the apparatus 50 for at least 1⅓ seconds in order to reject the defective object 55. The rejected object 55 is moved by a plunger 82 of the apparatus 50 to a reject receiving apparatus 80. At the end of ten frames, the counter 33 operates the conveyor step motor 34 and it resets the storage apparatus 12, and the counter 39 to initiate the next 10 frame monitoring sequence.

The sequence continues in this manner with the step motor 34 being operated three times each second to step the conveyor 52 and position another object 55 adjacent the monitoring camera 40. The camera 40 sequentially scans the rotating object 55 to develop video signals for comparison with the standard video signals.

A simple check of the accuracy of the system is readily provided as the standard object 60 is stepped on the conveyor 52 adjacent to the camera 40. The reject apparatus 50 should of course not operate when the camera 40 scans the standard object 60.

The monitoring system described in FIGURE 1 may be utilized for reconnaissance by recording signals from the camera 40 and thereafter comparing the recorded signals with subsequently developed signals from the camera 40. With the switch 13 set at its terminal 1 to effectively disconnect the camera 10 a switch 41a is closed to couple the signals from the camera 40 through the amplifier 41, the switch 41a and the amplifier 14 to the storage apparatus 12. The camera 40 may be monitoring any object which may change with time. For example, a prison yard may be monitored when empty. By opening the switch 41a to disconnect the camera 40 from the apparatus 12 and by moving the switches 20 and 12b to their respective terminals 3 to initiate the monitoring sequence, any change in the appearance of the yard is readily determined, by comparing the monitoring signals with the stored signals. Such change may, for example, be the presence of an individual in the yard. When such change is detected, the reject alarm and accumulator 51 provides a visible and audible indication that a change has taken place. The receiver 43 may be viewed by an operator to determine the exact location of the change, which in the above illustration, is the presence of an individual in the prison yard.

The embodiment shown in FIGURE 1 is a two dimensional monitoring system with only a single camera 40 being utilized to monitor the objects 55. In the embodiment shown in FIGURE 2, a three dimensional monitoring system is disclosed utilizing two cameras 110a and 110b for generating the standard video signals and two cameras 140a and 140b for monitoring or inspecting the objects 155. Many of the components illustrated in FIGURE 2 are similar to corresponding components described above and shown in FIGURE 1. The corresponding components in FIGURE 2 have been given similar designation numbers with the addition of 100. For example, the synchronizing generator 111 in FIGURE 2 is similar to the synchronizing generator 11 in FIGURE 1.

Assuming first that the clutches 194 in the rotating control arrangements 170 through 175 are not released as the conveyor 152 is stepped so that the standard object 160 and the objects 155 are not rotating, the two cameras 110a and 110b generate two sets of video signals which together represent a three dimensional image of the stationary standard 60. The video signals from the control camera 110a are introduced to a phase reversing circuit 109 and the phase reversed signals from the circuit 109 are multiplexed or added to the unreversed signals from the control camera 110b in an adding circuit 108. The phase reversed signals are coupled through an inhibiting gate 117 which blocks the phase reversed signals during the horizontal and vertical blanking intervals. The phase reversed signals to the adding circuit 108 include, therefore, only the video information but not the blanking and synchronizing pulses.

The output from the adding circuit 108 is a composite signal representing the sum of the phase reversed signal from the circuit 109 and the unreversed signal from the camera 110b. The instantaneous magnitude of the video signal from the camera 110a is, in general, different from the instantaneous magnitude of the signal from the camera 110b. When the phase reversed signal from the camera 109 is added to the unreversed signal from the camera 110b, they, therefore, in general, do not cancel each other so that the output from the added circuit 108 is a varying magnitude video signal.

The instantaneous magnitude of the two video signals from the cameras 110a and 110b are, however, identical when the cameras 110a and 110b are scanning points on a predetermined contour of the standard object 160. A contour represents the intersection of a plane parallel to the plane of the two cameras 110a and 110b and the external surface of the standard object 160. The contour, therefore, includes positions which are at a predetermined distance from the plane of the two camera lenses. The particular contour for which the magnitudes of the video signals are equal is determined by the physical arrangement of the cameras 110a and 110b with respect to each other and the standard 160. FIGURE 3 illustrates the effect of the scanning operation by the two cameras 110a and 110b with the images 3a and 3b corresponding to the views of the object 160 which are seen respectively at the cameras 110a and 110b. The two images 3a and 3b are shown superimposed in FIGURE 3C corresponding to the addition of the two sets of video signals if the vertical line 3v is scanned by both cameras at the same time position in the successive horizontal scanning lines. At any particular physical arrangement of the cameras 110a and 110b with respect to each other and with respect to the standard object 160, the two cameras 110a and 110b scan identical points of only one contour on the standard object 160. At the particular instant when the same contour is being scanned, the magnitude of the two video signals is identical. At all other times the two cameras are scanning different points on the object 160 so that the signals are dissimilar.

When the two images 3a and 3b viewed respectively by the cameras 110a and 110b are effectively superimposed, the distances between the images of the same point on the object 160 is referred to as the parallactic displacement for that point. Points on the same contour or distance to the plane of the camera lenses will have the same parallactic displacement regardless of their positions on the contour. There is a definite mathematical relation between the parallactic displacement for any point of the object 160 and the distance of that point to the plane of the camera lenses. The displacement is proportion to $B/H$ where B is the distance between camera lenses and H is the distance between the point on the object 160 and the plane of the camera lenses.

If the position of the cameras 110a and 110b relative to each other, or if their position relative to the standard object 160 is changed, identical instantaneous magnitudes are provided for a different contour. The change in the physical position of the cameras 110a and 110b effectively moves the images 3a and 3b with respect to each other so that when superimposed they provide for different contour intersections. The same contour changing effect is achieved by delaying one of the television signals with respect to the other. As shown in phantom in FIGURE 2, the signals from camera 110b are coupled through an adjustable delay circuit 124 which may be in the form of a delay line or magnetic tape with two spaced heads, none of which is shown. The delay circuit 124 is successively adjusted by a delay control circuit 119 which is operated by the vertical synchronizing pulses from the synchronizing generator 111. At each pulse from the generator 11, the control circuit 119 increases the delay provided by the delay circuit 124.

The delays are quite small being measured in microseconds because the duration of one horizontal line of the television signals is 63.5 microseconds. Assuming that each monitoring sequence has a duration of 10 scanning frames as described above in reference to FIGURE 1, the delay circuit 124 may be adjusted 20 times during the sequence. Twenty vertical synchronizing pulses are provided during the 10 frames due to the interlaced scanning with two fields in each frame. At the end of the tenth frame the control circuit 119 reduces the delay back to its initial value for the next monitoring sequence.

Due to the delay provided by the circuit 124, the two sets of video signals to the adding circuit 108 are somewhat out of step. The blanking and synchronizing information of the delayed signals are not, however, destroyed by the addition of the phase reversed signals because the delay does not have a duration comparable to the blanking intervals. The composite signal from the adding circuit 108 therefore includes the video signals indicating the successive contours in successive scanning fields and also the blanking and synchronizing pulses. All the information is provided through a signal channel or lead.

The composite signal from the adding circuit 108, therefore, has a varying magnitude except at one particular contour during each scanning field for which the two sets of video signals cancel to provide for a minimum instantaneous magnitude. The instantaneous signals representing the particular contour are of the same magnitude and so can readily be separate from the rest of the composite signals. The composite signals are coupled through a gating circuit 187 which passes only the contour signals. Under control of the blanking pulse from the generator 111, the circuit 187 functions as a short circuit during the blanking intervals to couple the synchronizing pulses to the switch 113. With the switch 113 set at position 3, the composite video signals are coupled through the amplifier 114 to the recording head 115 in the storage apparatus 112. A switch is provided to short the gate circuit 187 in the event separating the contour signals from the rest of the composite signals is not desired.

The operation of the rest of the system is similar to that of the system shown in FIGURE 1 and described above except for the modification to provide for the three-dimensional or contour scanning. The switches 120 and 112b are set at their terminals 3 in order to reproduce the information recorded in the single channel of the storage apparatus 112. The horizontal synchronizing pulses are separated by the separator 123 and coupled to the phase comparator 125 which controls the frequency of the oscillator 131 utilizing a reactance tube 129. The pulses from the oscillator 131 and the separated vertical synchronizing pulses from the separator 123 synchronize the generator 132 with the reproduced standard television signals. The generator 132 controls the two monitoring cameras 140a and 140b. The vertical synchronizing pulses from the generator 132 also operate the counter 133 which steps the conveyor motor 134 after a predetermined count of 20 indicating 10 scanning frames.

The signals from the camera 140a are phase reversed by a circuit 102 and introduced together with the unreversed signals from the camera 140b to an adding circuit 101. The phase reversed signals are gated by a gate 126 under control of the blanking pulses from the generator 132, and the signals from the camera 140 are delayed by an adjustable delay circuit 137 in a manner similar to the delay provided to the signals from the camera 110. The circuit 137 is successively adjusted by a control circuit 135 which is stepped by the vertical synchronizing pulses from the generator 132. The delayed signals from the delay circuit 137 are added to the phase reversed signals from the gate 126.

The composite signals from the adding circuit 101 are coupled through the gate circuit 188 which is similar to the circuit 187 so that in this manner this signals through the gate circuit 188 represent the successive contours of the object 155. The delay circuits 124 and 137 are identical so that the contour information of the composite signals from the adding circuit 101 is identical to the contour information of the composite signals from the adding circuit 108. The composite signals representing the successive contours of the object 155 are coupled through a video amplifier 141 to the adding circuit 142.

The reproduced composite video signals representing the standard object 160 are phase-reversed in a circuit 127 and the phase reversed signals are coupled through a video amplifier 128 to the adding circuit 142. The amplifier 128 may include threshold responsive means so that a signal corresponding to the scanned contour is provided and the amplifier 141 may also include threshold repsonsive means for providing a signal of equal magnitude but opposite polarity to the signal provided from the amplifier 128. The output of the adding circuit 142 is, therefore, a constant magnitude signal as long as the physical appearance of the object 155 being monitored is identical to the standard object 160. If the physical appearance differs, the contour information differs and the magnitude of the signal from the circuit 142, increases. The signals from the circuit 142 are coupled to a gate 149 which is enabled after a predetermined interval by the counter 139. The delay provided by the gate 139 is to insure the synchronization of the cameras 140a and 140b and the platforms 156 with the standard television signals from the storage apparatus 112. The counter 139 is stepped by the separated vertical synchronizing pulses through the gate 138. The counter 139 disables the gate 138 when it enables the gate 149.

The signals through the enabled gate 149 are introduced to the television receiver 143 and to the threshold amplifier 145. The threshold amplifier 145 is responsive to signals exceeding a predetermined magnitude for a predetermined interval to operate the timer 148. After a predetermined interval, which corresponds to the time for positioning the object 155 being scanned adjacent the apparatus 150, the timer 148 operates the reject apparatus 150 to reject the defective object 155. The rejected object 155 is pushed by the plunger 182 of the apparatus 150 into a reject receiving apparatus 180. The sequence continues in this manner with the successive contours of each object 155 being scanned and matched with the successive contours of the standard object 160. At the end of ten frames, the counter 133 steps the conveyor motor 136 and resets the storage apparatus 112 and the counter 139 to initiate the next monitoring sequence for the next object 155 on the conveyor 152.

The sequence of operations of the three dimensional monitoring system was described above in reference to FIGURE 2 with the platforms 156 and objects 155 being stationary. When the clutches 194 in the rotating control arrangements 170 are released, the platforms 156 rotate synchronously with respect to the video signals generated by the respective pairs of cameras. The sequence of operation is exactly the same except that instead of comparing signals representing one particular fixed contour during each of the successive scanning fields, the signals now represent the appearance of successive points on different contours of the standard object 160 and of the object 155 as these points rotate through predetermined contour planes and are scanned by the respective pairs of cameras. The plane in which the scanned points match is shifted successively under control of the delay circuits 124 and 137 for each scanning field. The points in the predetermined contour planes as represented by the two different sets of video signals are combined in the adding circuit 142 to monitor the object 155 being scanned by the cameras 140a and 140b with respect to the standard 160.

Although this application has been disclosed and illustrated with reference to particular applications, the principles involved are susceptible of numerous other applications which will be apparent to persons skilled in the art. For example, the timing of the various operations may be varied and the monitoring sequence may be longer or shorter than 10 scanning frames. Moreover, successive scanning instead of interlaced scanning may be utilized. The invention is, therefore, to be limited only as indicated by the scope of the appended claims.

I claim:
1. Apparatus for inspecting objects and for providing an indication when the physical appearance of an object deviates from the physical appearance of a standard, first means for movably supporting the standard, first means including a first television camera for scanning the standard and for generating line scan video signals in accordance therewith which include synchronizing pulses, first means coupled to said first supporting means and to said camera for moving the standard in synchronism with the line scan video signals, means coupled to said scanning and generating means for separating the synchronizing pulses from the rest of the generated line scan video signals, second means coupled to said separating means and including a second television camera for scanning an object to be inspected and for developing line scan video signals in accordance therewith which are synchronized by the pulses from said separating means with the video signals representing the standard, second means for movably supporting the object to be inspected, second means coupled to said second supporting means and to said separating means for moving the object to be inspected in synchronism with the video signals representing the object, and means coupled to said first and second scanning and developing means for recognizing a predetermined difference between the magnitudes of the video signals representing the object and the video signals representing the standard.

2. A monitoring system including a source of reference line-scan video signals representing the light intensity of successive points of a standard, first means synchronously operated with the reference line-scan video signals for generating line-scan video signals representing an object to be monitored, means coupled to said source for phase reversing the reference line-scan video signals, means for combining the phase reversed reference line-scan video signals with the line-scan signals representing the object to provide a signal of constant amplitude upon the occurrence of similar characteristics for successive scanned points on the object and on the reference and to provide a signal of a different instantaneous magnitude when the light intensity from any point on the object differs from the light intensity from the corresponding point on the standard, said source including a storage medium for recording line-scan video signals, and means connecting said generating means to said storage medium to couple the signals generated by said generating means for recording by said storage medium for use at a later time to detect any deviation in the instantaneous magnitude of the generated line-scan signals from the instantaneous magnitude of the recorded line-scan signals.

3. Apparatus for successively inspecting a number of objects in order to detect any deviation in the appearance of the objects from the physical appearance of a standard object, first means for rotatably supporting the standard object, second means including a television camera for generating line-scan video signals representing the appearance of the standard object, means coupled to said generating means and to said first supporting means for synchronously rotating the standard object under control of the generated line-scan video signals, third means for rotatably supporting each of the number of objects to be successively supported, fourth means including a television camera for generating line-scan video signals representing the appearance of any one of the number of the objects to be successively inspected, means coupled to said fourth generating means and to said third supporting means for synchronously rotating said one object being scanned under control of the line-scan video signals representing the appearance of said one object, means coupled to said fourth generating means for synchronously operating said fourth generating means with the line-scan video signals representing the appearance of the standard object, and means coupled to said second generating means and to said fourth generating means for combining the line-scan video signals representing the appearance of the standard object with the line-scan video signals representing the appearance of said one object.

4. In combination for monitoring a topographic area to determine any deviation in the appearance of the topographic area from the appearance of a topographic reference area, a first three dimensional scanning system for scanning the topographic reference area; a second three dimensional scanning system for scanning the topographic area to be monitored; each of said first and said second scanning systems including a first camera for scanning the area from a first position to produce signals having at any instant amplitudes dependent upon the light intensity of the position in the area being scanned at that instant, a second camera synchronously operated with said first camera for scanning the area from a second position displaced from the first position to produce signals having at any instant amplitudes dependent upon the light intensity of the position in the area being scanned at that instant, and comparison circuitry responsive to the signals from the first and second cameras for combining these signals at each instant to produce an output signal indicating the positions of topographic coincidence of scanning by the first and second cameras; and means coupled to said first and to said second three-dimensional scanning systems for comparing the output signal from the comparison circuitry of said second scanning system with the output signal from the comparison circuitry of said first scanning system to determine if there is a predetermined deviation therebetween.

5. In combination in accordance with claim 4 wherein each of said first and said second three dimensional scanning systems also includes delay means coupled to said first camera for delaying the signals from said first camera for a predetermined duration and introducing the delayed signals to said comparison circuitry so that the delay provides for different positions of coincidence scanned by the first and the second cameras.

6. In combination in accordance with claim 4 wherein each of said first and said second three dimensional scanning systems also includes adjustable delay means coupled to the associated first camera for delaying the signals from said first camera for predetermined durations, means synchronized with said first camera for successively changing the delay provided by said adjustable delay means, means coupled to said delay means and to the associated second camera for introducing the signals from the second camera together with the delayed signals to said comparison circuitry so that different positions of coincidence are scanned by the first and second cameras for each operation of said delay changing means.

7. In combination in accordance with claim 4 wherein said comparison circuitry includes phase reversing means coupled to the second camera, and means coupled to said phase reversing means and to said first camera for adding the signals from said first camera to the phase reversed signals from said phase reversing means to produce the output signal.

8. In combination in accordance with claim 4 wherein said comparison circuitry in each of said first and said second three dimension scanning systems including gating means for separating the signals representing positions of coincidence of scanning by the first and second cameras from the rest of the combined signals.

9. In combination in accordance with claim 6 wherein said comparison circuitry in each of said first and said second three dimensional scanning systems includes phase reversing means coupled to the associated second camera, and means coupled to said phase reversing means and to said adjustable delay means for combining the phase reversed signal with delay signals to produce the output signal.

10. Apparatus for inspecting a topographic contour of an object and for providing an indication when the appearance of the topographic contour deviates from the appearance of the same contour of a topographic reference, first means including a first pair of synchronously operated scanning means for generating line-scan video signals representing a particular topographic contour of the reference, second means including a second pair of synchronously operated scanning means for generating line-scan video signals representing a particular topographic contour of the object, means operatively coupled to the first and second means for synchronously operating said first and said second means, means coupled to said first and said second means for combining the line-scan video signals from the first and second means, and means coupled to said combining means for providing an indication when the combined signals indicate that the appearance of the topographic contour of the object deviates from the appearance of the topographic contour of the reference.

11. Apparatus for inspecting a stereoscopic object and for providing an indication when the stereoscopic appearance of the object deviates from the stereoscopic appearance of a reference at different topographic contours of the object and the reference, first means including a first pair of synchronously operated television cameras responsive to the reference for producing line-scan video signals representing stereoscopic images of the reference at the different topographic contours, second means including a second pair of synchronously operated television cameras for developing line-scan video signals representing stereoscopic images of the object being inspected at the different topographic contours, means coupled to the first and second means for obtaining a synchronous operation of the first and second pairs of television cameras, means coupled to the first and second means for combining the line-scanning video signals from the first and second means, and means coupled to said combining means for providing an indication when the combined signals indicate that the stereoscopic appearance of the object being inspected deviates from the stereoscopic appearance of the reference.

12. In combination for monitoring a topographic area to determine any deviation in the appearance of the topographic area from the appearance of a reference topographic area, first means for scanning the reference topographic area from a first pair of spaced positions to search in the area for positions of coincidence which are scanned at the same instant from the pair of spaced positions, second means for scanning the topographic area to be monitored from a second pair of spaced positions to search in the area for positions of coincidence which are scanned at the same instant from the second pair of spaced positions, and means jointly coupled to said first scanning means and to said second scanning means for comparing the signals from the first and second scanning means to produce output signals representing the relative topography of the positions scanned at each instant by the first and second scanning means.

References Cited in the file of this patent
UNITED STATES PATENTS

| | | |
|---|---|---|
| 2,026,330 | Tauschek | Dec. 31, 1935 |
| 2,679,636 | Hillyer | May 25, 1954 |
| 2,798,605 | Richards | July 9, 1957 |
| 2,955,155 | Mayer | Oct. 4, 1960 |

Notice of Adverse Decision in Interference

In Interference No. 94,219 involving Patent No. 3,049,588, J. S. Barnett, QUALITY CONTROL SYSTEM, final judgment adverse to the patentee was rendered Dec. 17, 1964, as to claim 2.

[*Official Gazette February 23, 1965.*]